United States Patent [19]

Yamawaki

[11] Patent Number: 4,587,470
[45] Date of Patent: May 6, 1986

[54] MULTIPLEX CONTROL SYSTEM

[75] Inventor: Masahiko Yamawaki, Hyogo, Japan

[73] Assignee: Mitsubishi Denki Kabushiki Kaisha, Tokyo, Japan

[21] Appl. No.: 661,948

[22] Filed: Oct. 17, 1984

[30] Foreign Application Priority Data

Oct. 18, 1983 [JP] Japan ................... 58-196576

[51] Int. Cl.⁴ .................................................. G05B 9/03
[52] U.S. Cl. ....................................... 318/564; 318/565; 318/632; 318/610; 364/135; 364/162
[58] Field of Search ............... 318/632, 563, 561, 565, 318/564, 610, 611, 615, 616, 617, 609, 621; 364/131, 135, 605, 148, 187, 162, 161, 180; 371/8, 9, 11

[56] References Cited

U.S. PATENT DOCUMENTS

| | | | |
|---|---|---|---|
| 4,013,877 | 3/1977 | Uram | 364/187 X |
| 4,031,372 | 6/1977 | Davis | 364/187 X |
| 4,209,734 | 6/1980 | Osder | 318/565 X |
| 4,390,942 | 6/1983 | de Keizer | 364/162 |
| 4,504,905 | 3/1985 | Burrage | 364/131 X |

FOREIGN PATENT DOCUMENTS 59-20182 1/1984 Japan .

*Primary Examiner*—William M. Shoop, Jr.
*Assistant Examiner*—Patrick C. Keane
*Attorney, Agent, or Firm*—Bernard, Rothwell & Brown

[57] ABSTRACT

A multiplex control system including a plurality of controllers, the main controller being arranged by hardware, while the subsidiary controller being accomplished by software. Each of the controllers has a PID operator for calculating the proportional, differential and integral components of process data, and the difference of the integral components of both PID operators is processed through a first-order time lag operator and the result is used to correct the error of the output from the PID operator of the subsidiary controller. In the occurrence of abnormality, control of the control object is switched from the main controller to the subsidiary controller using the first-order time lag element attached to the switch unit thereby preventing the tracking of control data.

2 Claims, 2 Drawing Figures

MULTIPLEX CONTROL SYSTEM

BACKGROUND OF THE INVENTION

1. Field of the Invention

The present invention relates to a multiplex control system including a main controller and a subsidiary controller with different control characteristics, the system being capable of getting rid of the output error between these controllers.

2. Description of the Prior Art

Many of conventional multiplex control systems have been organized by combining a plurality of controllers made of the same hardware means and software means. FIG. 1 shows, as an example of such multiplex control systems, the arrangement of a dual control system. The system includes a process data input unit 10 receiving process data, e.g., pressure, temperature, flow rate, etc., from process lines (not shown), a main controller 11, a subsidiary controller 12, a data link unit 13, a switch unit 14, and a control object 15, e.g., valves. The operation of this system is as follows. In FIG. 1, process data collected on process lines (not shown) are received by the process data input unit 10 and delivered to the main controller 11 and subsidiary controller 12. The main controller 11 performs computation based on the data and transmits the result through the data link 13 to the subsidiary controller 12. In the event of a failure of the main controller 11, a switch unit 14 operates to transfer control of the control object from the main controller 11 to the subsidiary controller 12.

In this case, computational data processed by the main controller 11 is transmitted uninterruptedly to the subsidiary controller 12 through the data link unit 13, and therefore the control operation for the control object 15 is switched from the main controller to the subsidiary controller smoothly in a bumpless fashion. However, such a conventional multiplex control system, when applied to a system including a main and subsidiary controllers of different hardware structures, e.g., analog and digital devices, encounters difficulty in tracking computational data at the occurrence of a failure, and furthermore there are technical problems of realizing the bumpless switching of controllers.

SUMMARY OF THE INVENTION

It is an object of the present invention to provide a multiplex control system including a main controller dictated by analog hardware devices and a subsidiary controller dictated by digital hardware devices, the system being capable of switching control from the main to subsidiary controller in the event of a failure in the main controller in a bumpless fashion without control error.

According to one form of the present invention, the difference between the integral term of the analog PID operator in the main controller and the integral term of the subsidiary PID operator is added to the integral term provided by the digital PID operator of the subsidiary controller through the operator of time lag of first order, whereby the output error of the digital PID operator is cancelled and, when the difference between the output of the digital PID operator and the output of the analog PID operator has increased beyond a predetermined value, the switch unit performs switching of control in a bumpless fashion from the main controller to the subsidiary controller.

DESCRIPTION OF THE PREFERRED EMBODIMENTS

Figure 1:
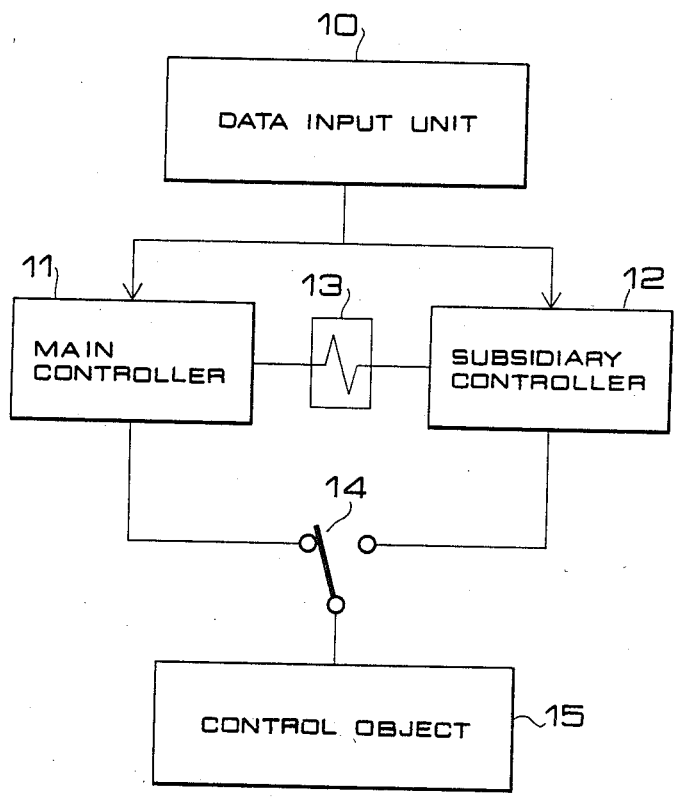
FIG. 1 is a block diagram of the conventional multiplex control system including controllers of the same control characteristics.
Figure 2:
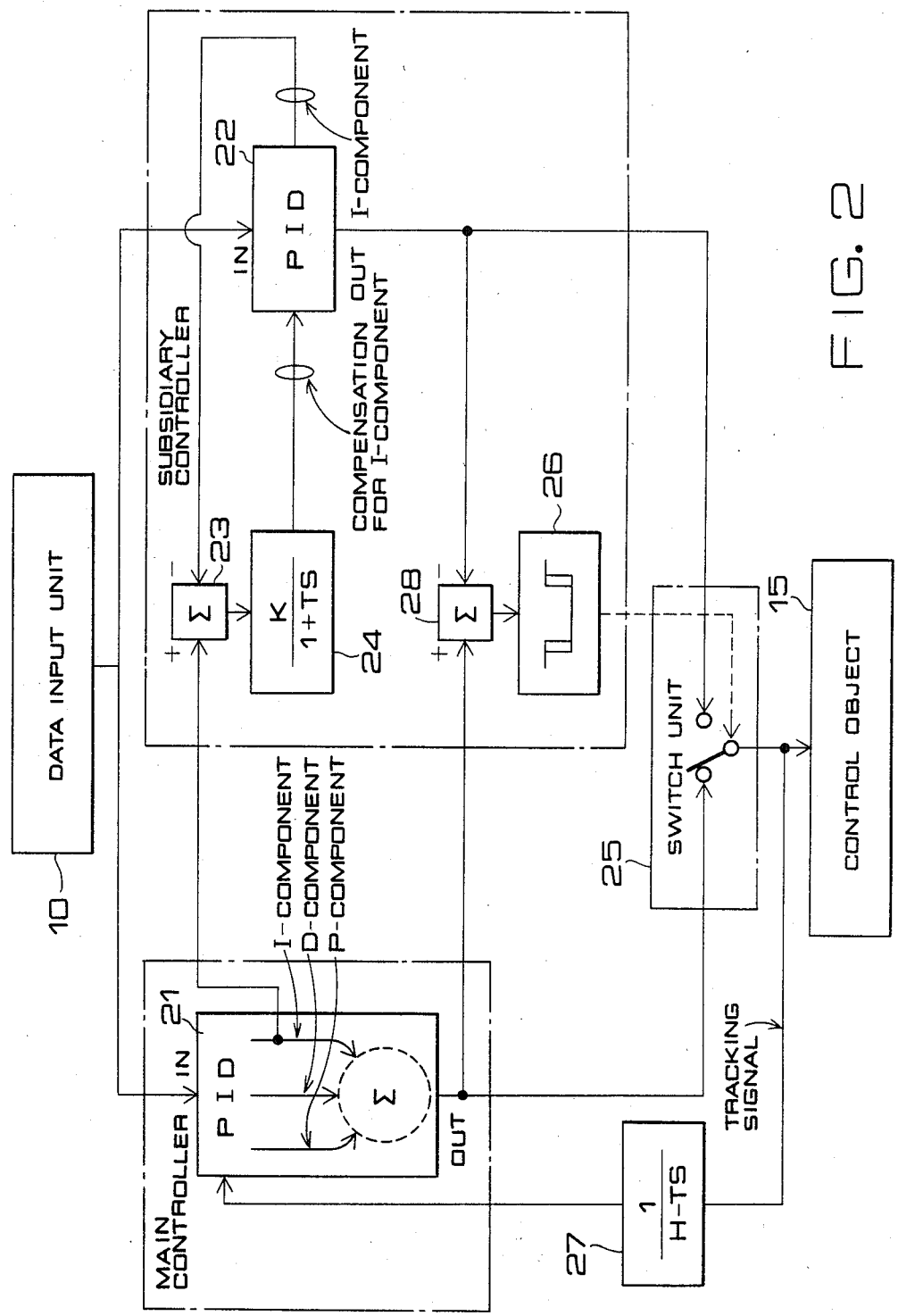
FIG. 2 is a block diagram of the multiplex control system embodying the present invention.

One embodiment of the present invention will now be described with reference to the drawing. In FIG. 2, component blocks 10 and 15 denote a process data input unit and a control object identical to those of the conventional system as mentioned previously. The system further includes an analog PID operator (operational circuit) 21 provided within the main controller 11 and adapted to perform computation in response to the proportional component, integral component and differential component of process data fed from the process data input unit 10, a digital PID operator (operational circuit) 22 provided within the subsidiary controller 12 and adapted to perform the PID computation equivalent to that of the analog PID operator 21, an adder/subtracter 23 which calculates the difference, as control error, between the integral component of the output of the analog PID operator 21 and the integral component of the output of the digital PID operator 22, and a time lag operator 24 which provides a time lag of first order for the control error. The analog PID operator 21 is achieved by hardware, while the digital PID operator 22, adder/subtracter 23 and time lag operator 24 are achieved by software. Further included in the system are an adder/subtracter 28 which calculates the difference, as output error, between the output of the digital PID operator 22 and the output of the analog PID operator 21 and operates on a switching signal generator 26 to activate a switch unit 25, and a first-order time lag element 27 used to prevent the analog PID operator 21 from tracking the open-circuited state when the relay in the switch unit 25 operates.

The operation of the foregoing system arrangement will be described in the following. In case tracking of data does not take place, the computational error will be integrated, resulting in the divergence of control output, due to the different operational characteristics of the analog PID operator 21 in the main controller and the digital PID operator 22 in the subsidiary controller. To avoid this, the difference between the integral term of the analog PID operator 21 and the integral term of the digital PID operator 22 is processed through the time lag operator 24 and added to the integral term of the digital PID operator 22, so that the output error of the digital PID operator 22 is cancelled after a sufficient time length has elapsed. By choosing the time constant T of the time lag operator 24 appropriately, the control output can be prevented from diverging, while retaining the sensitivity of abnormality detection for the main controller.

In the occurrence of abnormality, when the output error calculated from the outputs of the digital PID operator 22 and analog PID operator 21 by the adder/subtracter 28 exceeds the predetermined value, the switching signal generator 26 issues the switching signal to the switch unit 25 so that the control of the main controller is replaced by the control of the subsidiary controller. On this account, in the inventive multiplex control system, the difference of control outputs of the main controller 11 and subsidiary controller 12 is prevented from diverging, and upon occurrence of abnormality in the main controller, the subsidiary controller can take control in a bumpless fashion without leaving a difference of outputs between these controllers.

In case the system is operated in manual mode without using the main and subsidiary controllers 11 and 12, or when the system is operated in the normal state using the output of the digital PID operator in the subsidiary controller 12, the time lag operator 24 is invalidated so that it does not affect the control characteristics.

Although in the foregoing embodiment only the integral components of the PID computations in the main controller 11 and susidiary controller 12 are taken into account for compensation, the same effect will be achieved when the output error in a first-order time lag is added as a compensation input to the process error input.

According to the present invention, as described above, controllers with different control characteristics can be multiplexed, whereby an existing analog control system can readily be multiplexed for the enhancement of reliability and, at the same time, in the occurrence of abnormality of the main controller it can be replaced with the subsidiary controller in a bumpless fashion without the divergence of control output error.

What is claimed is:

1. A multiplex control system including a main controller and subsidiary controller with different control characteristics connected through a switch unit to a control object, said main controller comprising an analog circuit and said subsidiary controller comprising a digital circuit, each of said main and subsidiary controllers comprising a PID operator for calculating proportional, differential and integral components;

said system including a compensation means for eliminating output error caused by differences of the control characteristics between said main controller and said subsidiary controller; and said compensation means being so arranged that the integral term of said PID operator of said main controller is processed through a time lag operator of first order and added to the integral term of said PID operator of said subsidiary controller thereby to compensate an output error.

2. A multiplex control system according to claim 1, wherein said switch unit is additionally provided with a time lag element of first order so that said system is prevented from tracking the output signal from the PID operator of said main controller when said signal is interrupted momentarily during the operation of said switch unit.

* * * * *